US008797998B2

(12) United States Patent
Wang et al.

(10) Patent No.: US 8,797,998 B2
(45) Date of Patent: Aug. 5, 2014

(54) METHOD AND DEVICE FOR INDICATING DATA RE-TRANSMISSION WHEN AREA SWITCHING IN LTE SYSTEM

(75) Inventors: Ying Wang, Beijing (CN); Haijing Hu, Beijing (CN); Yihua Jiang, Beijing (CN); Guosheng Zhao, Beijing (CN); Xunwei Zhao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 385 days.

(21) Appl. No.: 12/677,502

(22) PCT Filed: Sep. 2, 2008

(86) PCT No.: PCT/CN2008/072231
§ 371 (c)(1),
(2), (4) Date: Mar. 10, 2010

(87) PCT Pub. No.: WO2009/033400
PCT Pub. Date: Mar. 19, 2009

(65) Prior Publication Data
US 2010/0177736 A1    Jul. 15, 2010

(30) Foreign Application Priority Data

Sep. 11, 2007 (CN) .......................... 2007 1 0121647

(51) Int. Cl.
*H04W 4/00* (2009.01)
(52) U.S. Cl.
USPC ........................................................ 370/331
(58) Field of Classification Search
None
See application file for complete search history.

(56) References Cited

U.S. PATENT DOCUMENTS

| 2003/0007490 A1 | 1/2003 | Yi et al. |
| 2003/0189909 A1 | 10/2003 | Chao et al. |
| 2007/0213060 A1* | 9/2007 | Shaheen ...................... 455/436 |
| 2007/0293226 A1* | 12/2007 | Lee et al. ..................... 455/436 |
| 2009/0124259 A1* | 5/2009 | Attar et al. ................... 455/436 |

FOREIGN PATENT DOCUMENTS

| CN | 1933664 A | 3/2007 |
| CN | 1949925 A | 4/2007 |

(Continued)

OTHER PUBLICATIONS

3GPP Organizational Partners, 3GPP TS 36.300 V8.0.0 (Mar. 2007), 3rd Generation Partnership Project; Technical Specification Group Radio Access Network; Evolved Universal Terrestrial Radio Access (E-UTRA) and Evolved Universal Terrestrial Radio Access Network (E UTRAN); Overall description; Stage 2 (Release 8).
3GPP TSG-RAN WG2 058-bis, Ericsson, Status Reporting at inter eNB mobility, Orlando USA, Jun. 25-29, 2007.
3CPP TSC-RAN W02 #58, Ericsson, User lane handling at mobility, Kobe Japan, May 7-11, 2007.

(Continued)

*Primary Examiner* — Yemane Mesfin
*Assistant Examiner* — Samina Choudhry
(74) *Attorney, Agent, or Firm* — Workman Nydegger

(57) ABSTRACT

A method and device for indicating data re-transmission when area switching in LTE system, wherein the method comprises the following steps: S_eNB sends PDCP-SDU CN report to T_eNB in order to announce PDCP-SDU SN received, and T_eNB announces PDCP-SDU SN received by S_eNB to UE. Thereby, UE would not re-transmit PDCP-SDU corresponding to received SN, which avoids re-transmission of useless PDCP-SDU, and saves radio resources comparing with prior solutions.

3 Claims, 10 Drawing Sheets

(56) References Cited

FOREIGN PATENT DOCUMENTS

| | | |
|---|---|---|
| CN | 1997200 A | 7/2007 |
| CN | 101094461 | 12/2007 |
| EP | 1276279 | 1/2003 |
| JP | 2000-505261 | 4/2000 |
| JP | 2003102055 | 4/2003 |
| JP | 2009-520435 | 5/2009 |
| JP | 2010525737 | 7/2010 |
| KR | 2003-0005537 | 1/2003 |
| WO | WO 2005055636 | 6/2005 |
| WO | WO2007073040 | 6/2007 |
| WO | 2007/089560 A1 | 8/2007 |
| WO | WO 2007095966 | 8/2007 |

OTHER PUBLICATIONS

3GPP TSG RAN WG2 Meeting #58bis, Research in Motion Limited, User Plane Data Handling at Handover, Orlando USA, Jun. 25-29, 2007.

3GPP TSG-RAN WG2 Meeting #58, Nokia, NSN, User Plane Data Handling at Handover, Kobe Japan, May 7-11, 2007.

3GPP TSG-RAN W03 Meeting #57, Change Request, Athens Greece, Aug. 20-24, 2007.

Application No. 2010-524337, Mail Date Feb. 20, 2012, JP Office Action.

Application No. EP 08800743.0, Mail Date Feb. 12, 2014, Extended European Search Report.

\* cited by examiner

METHOD AND DEVICE FOR INDICATING DATA RE-TRANSMISSION WHEN AREA SWITCHING IN LTE SYSTEM

The present application claims priority to Chinese Patent Application No. 200710121647.X, entitled "METHOD FOR DATA RE-TRANSMISSION DURING CELL HANDOVER IN LTE SYSTEM AND APPARATUS THEREOF", filed with Chinese Patent Office on Sep. 11, 2007, which is incorporated herein in its entirety.

FIELD OF THE INVENTION

The present invention relates to the technical field of the Long Time Evolution (LTE) system in mobile communications, and particularly to a method for indicating data re-transmission during cell handover in the LTE system and a device thereof.

BACKGROUND OF THE INVENTION

During the cell handover in the LTE system, the idea of User Equipment (UE) assistant to network control, i.e., the steps of "measure-report-decide-execute", is still adopted. When the Source Evolved Node B (S_eNB) decides that the UE shall handover to the Target Evolved Node B (T_eNB) according to measurement reports from the UE and the T_eNB, the S_eNB exchanges information with the T_eNB directly via an X2 interface, to complete resource preparation in the target cell; then, the S_eNB instructs the UE to handover to the target cell; after a successful handover, the T_eNB informs the S_eNB to release radio resource of the original cell. In addition, the S_eNB transmits data that is not transmitted yet to the T_eNB and updates relation of nodes between a user plane and a control plane.

Referring to FIG. 1, a flowchart of cell handover in the LTE system in the prior art mainly includes:

[1] The S_eNB configures the UE with a measurement procedure;

[2] The UE sends a measurement report to the S_eNB;

[3] The S_eNB makes a UE handover decision according to the measurement report and Radio Resource Management (RRM) information;

[4] The S_eNB sends a handover request to the T_eNB;

[5] On receiving the handover request from the S_eNB, the T_eNB performs an admission control procedure according to the received E-RAB Quality of Service (QoS) information;

[6] The T_eNB sends a Handover Request Acknowledge message to the S_eNB;

[7] The S_eNB sends a Handover Command message to the UE, to instruct the UE to perform a handover;

[8] The UE sends a Synchronization message to the T_eNB;

[9] The T_eNB feeds a Synchronization Reply message back to the UE, the Synchronization Reply message including UL resource allocation information, a time advance, etc.;

[10] The UE sends a Handover Complete Acknowledge message to the T_eNB after the UE accesses the target cell successfully.

On the user plane, in order to avoid loss of uplink data from the UE and to maintain ordered transmission of the uplink data during the handover, an uplink data forwarding solution is adopted, which is performed between step [7] and step [8] of FIG. 1 (as illustrated by dotted lines). Generally, the data forwarding refers to that: the S_eNB forwards received disordered Packet Data Convergence Protocol-Service Data Units (PDCP-SDUs) to the T_eNB, and the PDCP-SDUs are attached with Sequence Numbers (SNs), then the T_eNB sends the received PDCP-SDUs to the Service Gateway (S-GW). During the handover, ordered transmission of upper layer PDUs is based on continuous PDCP-SNs and a re-order function provided by the PDCP layer. In the uplink, the re-order function of the PDCP layer of the T_eNB ensures the ordered transmission of the uplink PDCP-SDUs.

In the present LTE system, the air interface is based on the Automatic Repeat Request/Hybrid Automatic Repeat Request (ARQ/HARQ) mechanism. The S_eNB feeds ACKs back to the UE on successfully receiving ordered PDCP-SDUs. The UE re-transmits to the T_eNB those PDCP-SDUs whose ACKs are not received at the UE. It is not difficult to understand that the UE does not receive any ACK to a PDCP in two cases: in the first case, the S_eNB does not receive the PDCPs due to reasons such as network, etc., and does not feed ACKs back to the UE accordingly; in the second case, the S_eNB has received ordered PDCPs successfully, however, ACKs are not fed back to the UE successfully due to network reasons. The above second case may result in insignificant re-transmission from the UE to the T_eNB and a waste of precious radio resource. Examples are described hereinafter with reference to the two cases.

FIG. 2 illustrates a fact in which re-transmission of PDCP-SDUs from the UE results in an insignificant waste. The S_eNB receives data 1, 2 and 3 from the UE successfully and transmits the data 1, 2 and 3 to the S-GW via an S1 interface. It is assumed that the UE receives only an ACK to the data 1 fed back from the network side and does not receive ACKs to the data 2 and 3. In this case, the UE continues to send the data 2 and 3 to the T_eNB, the T_eNB receives the data 2 and 3 and sends the re-transmitted data 2 and 3 to the S-GW, which results in reception of repeated data in the Evolved Packet Core (EPC) system and a waste of precious radio resource at the air interface.

FIG. 3 illustrates another fact in which re-transmission of PDCP-SDUs from the UE results in an insignificant waste. The UE sends data a, b, c and d to the S_eNB, however, the data b fails during transmission and the S_eNB receives only the data a, c and d, and the data c and d becomes disordered. According to the conventional solution of data forwarding, the S_eNB sends the ordered data a to the S-GW, buffers the disordered data c and d in a buffer, and then sends the data c and d to the T_eNB which delivers the data c and d to the S-GW. It is assumed that the UE does not receive any ACK to the data c and d. In this case, the UE receives only an ACK to the data a, and re-transmits the data b, c and d to the T_eNB because the UE does not receive any ACK to the data b, c and d. Apparently, the data c and d is re-transmitted. On one hand, the S_eNB sends the buffered data c and d to the T_eNB; on the other hand, the UE re-transmits the data c and d to the T_eNB due to no reception of any ACK, thereby resulting in a waste of resource.

SUMMARY OF THE INVENTION

In view of this, the present invention provides a method for indicating data re-transmission during cell handover in a Long Time Evolution (LTE) system, so as to solve the problem of waste of radio resource due to re-transmission of redundant PDCP-SDUs in the conventional solution.

Corresponding to the method, the present invention further provides a device for indicating data re-transmission during cell handover in a Long Time Evolution (LTE) system, i.e., an eNB, and a UE.

The technical solution of the present invention is described as follows:

A method for indicating data re-transmission during cell handover in a Long Time Evolution (LTE) system includes:

sending, by a Source Evolved Node B (S_eNB), a Packet Data Convergence Protocol-Service Data Unit Sequence Number (PDCP-SDU SN) report to a Target Evolved Node B (T_eNB), for informing of PDCP-SDU SNs that have been received by the S_eNB; and informing, by the T_eNB, User Equipment (UE) the PDCP-SDU SNs that have been received by the S_eNB.

The method further includes: discarding, by the UE, PDCP-SDUs that have been received by the S_eNB from a re-transmission queue according to the received PDCP-SDU SNs, and re-transmitting only the rest of PDCP-SDUs in the queue to the T_eNB.

The T_eNB informs the UE of the PDCP-SDU SNs received by the S_eNB through a synchronization reply message, a Radio Resource Control (RRC) message, a Radio Link Control (RLC) message or a Media Access Control (MAC) message.

Preferably, after the UE is synchronized with the T_eNB, the T_eNB determines whether the T_eNB has received the PDCP-SDU SN report; the T_eNB sends to the UE the synchronization reply message carrying the PDCP-SDU SNs that have been received by the S_eNB if the T_eNB has received the PDCP-SDU SN report; and the T_eNB sends to the UE the synchronization reply message carrying no PDCP-SDU SN if the T_eNB has not received the PDCP-SDU SN report.

Or, after the UE is synchronized with the T_eNB, the T_eNB determines whether the T_eNB has received the PDCP-SDU SN report; the T_eNB sends to the UE the synchronization reply message carrying the PDCP-SDU SNs that have been received by the S_eNB if the T_eNB has received the PDCP-SDU SN report; and if the T_eNB has not received the PDCP-SDU SN report, the T_eNB waits for a preset period of time, and sends to the UE the synchronization reply message carrying no PDCP-SDU SN if the T_eNB does not receive the PDCP-SDU SN report within the preset period of time; and the T_eNB sends to the UE the synchronization reply message carrying the PDCP-SDU SNs that have been received by the S_eNB if the T_eNB receives the PDCP-SDU SN report within the preset period of time.

Or, after the UE is synchronized with the T_eNB, the T_eNB determines whether the T_eNB has received the PDCP-SDU SN report; the T_eNB sends to the UE the synchronization reply message carrying the PDCP-SDU SNs that have been received by the S_eNB if the T_eNB has received the PDCP-SDU SN report; and if the T_eNB has not received the PDCP-SDU SN report, the T_eNB sends to the UE the synchronization reply message carrying no PDCP-SDU SN; and the T_eNB sends to the UE the RRC message, the RLC message or the MAC message immediately to inform the UE of the PDCP-SDU SNs that have been received by the S_eNB.

The time when the S_eNB sends the PDCP-SDU SN report to the T_eNB is when the S_eNB receives an acknowledge message to a handover command message fed back from the UE, or when a preset time arrives from the time of sending the handover command message from the UE if the S_eNB does not receive any acknowledge message to the handover command message.

An Evolved Node B (eNB) for indicating data re-transmission during cell handover in a Long Time Evolution (LTE) system includes: an X2 interface unit, a User Equipment (UE) interface unit communicated with UE, where the eNB further includes: a report assembling unit and a message assembling unit; the report assembling unit is adapted to assemble a Packet Data Convergence Protocol-Service Data Unit Sequence Number (PDCP-SDU SN) report including SNs of PDCP-SDUs received at the UE interface, the report being sent to the T_eNB via the X2 interface unit; the message assembling unit is adapted to assemble a message including PDCP-SDU SNs that have been received at the S_eNB according to the PDCP-SDU SN report received at the X2 interface unit, and send the message to the UE via the UE interface unit.

The message assembled by the message assembling unit is a synchronization reply message, a Radio Resource Control (RRC) message, a Radio Link Control (RLC) message or a Media Access Control (MAC) message.

A User Equipment (UE) for controlling data re-transmission during cell handover in a Long Time Evolution (LTE) system includes: an Evolved Node B (eNB) interface unit communicated with a Source Evolved Node B (S_eNB) or a Target Evolved Node B (T_eNB) and a re-transmission queue in which Packet Data Convergence Protocol-Service Data Units (PDCP-SDUs) are buffered, where the UE further includes: a message parsing unit and a queue adjustment unit; where the eNB interface unit is adapted to receive from the T_eNB a message indicating PDCP-SDU Sequence Numbers (SNs) that have been received by the S_eNB; the message parsing unit is adapted to parse the message to obtain the PDCP-SDU SNs that have been received by the S_eNB; the queue adjustment unit is adapted to discard the PDCP-SDU SNs that have been received by the S_eNB from the re-transmission queue, and the eNB interface unit re-transmits the rest of PDCP-SDUs in the re-transmission queue to the T_eNB.

The message indicating PDCP-SDU SNs that have been received by the S_eNB is a synchronization reply message, a Radio Resource Control (RRC) message, a Radio Link Control (RLC) message or a Media Access Control (MAC) message.

The above technical solution includes the following technical effects:

In the solution of cell handover in the LTE system according to the prior art, the UE re-transmits a PDCP to the T_eNB if only the UE does not receive an ACK to the PDCP. However, in the present invention, the UE further determines whether the UE has received from the T_eNB a PDCP-SN indicating that the S_eNB has received the PDCP. If the UE does not receive the ACK to the PDCP but receives the PDCP-SN indicating that the S_eNB has received the PDCP, the UE does not re-transmit the PDCP, thereby avoiding re-transmission of redundant PDCPs and resulting in effective saving of radio resource compared with the conventional solution.

DETAILED DESCRIPTION OF THE INVENTION

The core of the present invention lies in that a process is added during cell handover of the UE, i.e., the S_eNB informs the UE via the T_eNB that which PDCP-SDUs have been received by the S_eNB successfully and the UE does not need to re-transmit the PDCP-SDUs even if the UE does not receive ACKs to the PDCP-SDUs.

Further, the present invention is implemented in the following manner:

1] The S_eNB sends a PDCP-SDU SN report to the T_eNB, to inform the T_eNB of PDCP-SDU SNs (including SNs of all ordered and unordered PDCP-SDUs) that have been received by the S_eNB;

2] The T_eNB re-transmits the PDCP-SDU SNs to the UE according to the report, to inform the UE which PDCP-SDUs have been received;

3] The UE does not re-transmit the PDCP-SDUs according to the received PDCP-SDU SNs.

In the solution of cell handover in the LTE system in the prior art, the UE re-transmits a PDCP-SDU to the T_eNB if only the UE does not receive an ACK to the PDCP-SDU. However, in the present invention, the UE further determines whether the UE has received from the T_eNB the SN indicating that the S_eNB has received the PDCP-SDU. If the UE does not receive an ACK to a PDCP-SDU but receives a PDCP-SDU SN indicating reception of the PDCP-SDU, the UE does not re-transmit the PDCP-SDU, thereby avoiding re-transmission of duplicate PDCP-SDU and resulting in effective saving of radio resource compared with the conventional solution.

Embodiments of the present invention are described in detail hereinafter with reference to the accompanying drawings.

It is not difficult to understand that a signaling is added in cell handover according to the present invention, so as to transmit the PDCP-SDU SNs that have been received by the S_eNB. The UE does not re-transmit the PDCP-SDUs. In order to make the whole procedure more clear, the procedure of cell handover in the LTE system, i.e., a modified solution based on the cell handover described in the background of the invention, is described hereinafter.

Figure 4:
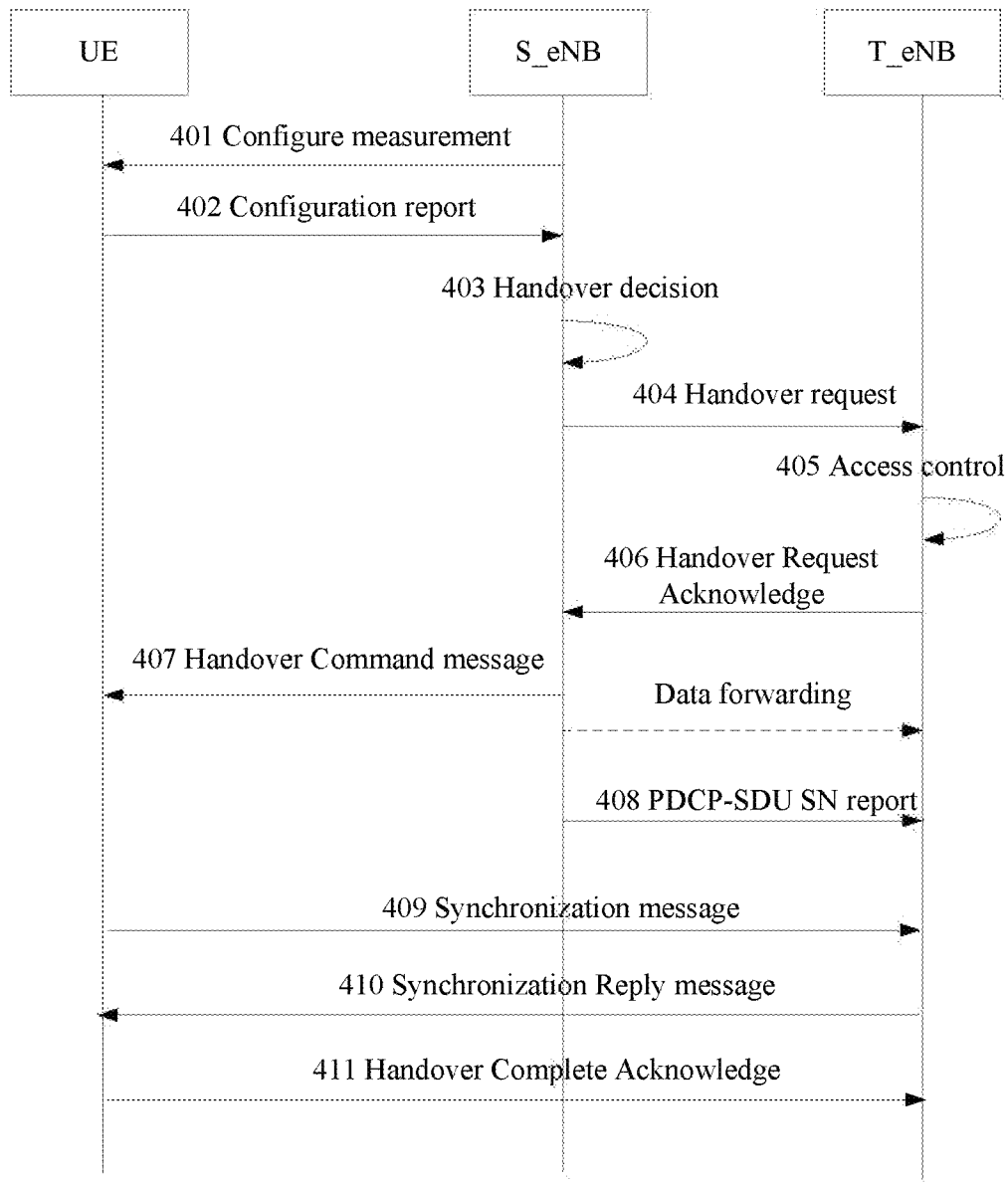
FIG. 4 is a diagram of a first embodiment of the method according to the present invention.

FIG. 4 is a diagram of cell handover in the LTE system according to the first embodiment. The cell handover includes the following steps:

In step 401, the S_eNB configures the UE with a measurement procedure according to roaming restriction information.

The measurement information provided by the S_eNB may be of assistance to control the connection mobility function of the UE.

In step 402, the UE sends a measurement report to the S_eNB.

In step 403, the S_eNB makes a handover decision to perform cell handover of the UE according to the measurement report from the UE and RRM information.

In step 404, the S_eNB sends to the T_eNB a Handover Request message carrying necessary information so that the T_eNB prepares handover resource. The Handover Request message also indicates whether the system supports DL/UL data forwarding, and the Handover Request message further includes a SAE bearer context.

The SAE bearer context includes Transport Network Layer (TNL) information of the S-GW for transmitting upper layer data, QoS information born by SAE, etc.

In step 405, the T_eNB performs an admission control procedure based on the received QoS information born by SAE.

In step 406, the T_eNB sends a Handover Request Acknowledge message to the S_eNB while preparing the handover resource.

The Handover Request Acknowledge message includes a Tunnel End Point Identifier (TEID) and an address of TNL supporting DL/UL data forwarding allocated by the T_eNB.

In step 407, the S_eNB sends a Handover Command message to the UE to instruct the UE to perform handover on receiving the Handover Request Acknowledge message from the T_eNB.

The Handover Command message includes a new Radio Network Temporary Identity (RNTI), a possible starting time, a System Information Block (SIB) of the T_eNB, etc.

On receiving the Handover Command message from the S_eNB, the UE ceases sending PDCP-SDUs to the S_eNB. The UE may utilize a Radio Link Control (RLC) Acknowledge procedure or other mechanisms to ensure proper reception of the Handover Command message.

After sending the Handover Command message, the S_eNB commences performing the UL/DL data forwarding, i.e., buffers the PDCP-SDUs received from the UE in the Buffer and sends the PDCP-SDUs to the T_eNB.

In step 408, the S_eNB sends a "PDCP-SN report" to the T_eNB via an X2 interface to inform the T_eNB of SNs of all received PDCP-SDUs on receiving the RLC layer Acknowledge message in response to the Handover Command message or after the S_eNB waits for a period of time in case of receiving no RLC layer Acknowledge message.

The above-mentioned period of time in case of receiving no RLC layer Acknowledge message depends on the possible starting time of the Handover Command message.

In step 409, the UE sends a Synchronization message to the T_eNB to request synchronization with the T_eNB once the possible starting time of the Handover Command message arrives. Then, the T_eNB begins to obtain the time advance of the UE.

In step 410, after the UE is synchronized with the T_eNB, the T_eNB sends to the UE a Synchronization Reply message including UL resource allocation information, the time advance, the PDCP-SNs of the PDCP-SN report, etc.

The T_eNB may possibly not receive the PDCP-SN report from the S_eNB in time due to the delay of the X2 interface after the UE is synchronized with the T_eNB. If the T_eNB has not received the PDCP-SN report when replying to the UE, the Synchronization Reply message does not include the PDCP-SNs; otherwise the Synchronization Reply message includes the PDCP-SNs.

The UE discards corresponding PDCPs from the re-transmission queue according to the indication of PDCP-SNs for the purpose of saving rare resource of the air interface. The UE proceeds as the prior art in case of no PDCP-SNs. It can be seen that the solution according to the present invention is easy to be compatible with the prior art.

In step 411, the UE sends a Handover Confirm message to the T_eNB after the UE accesses the target cell successfully, to inform of the completion of handover procedure.

Therefore, the present invention emphasizes on addition of step 408, modification to step 410, and subsequent re-transmission of PDCPs at the UE.

Figure 5:
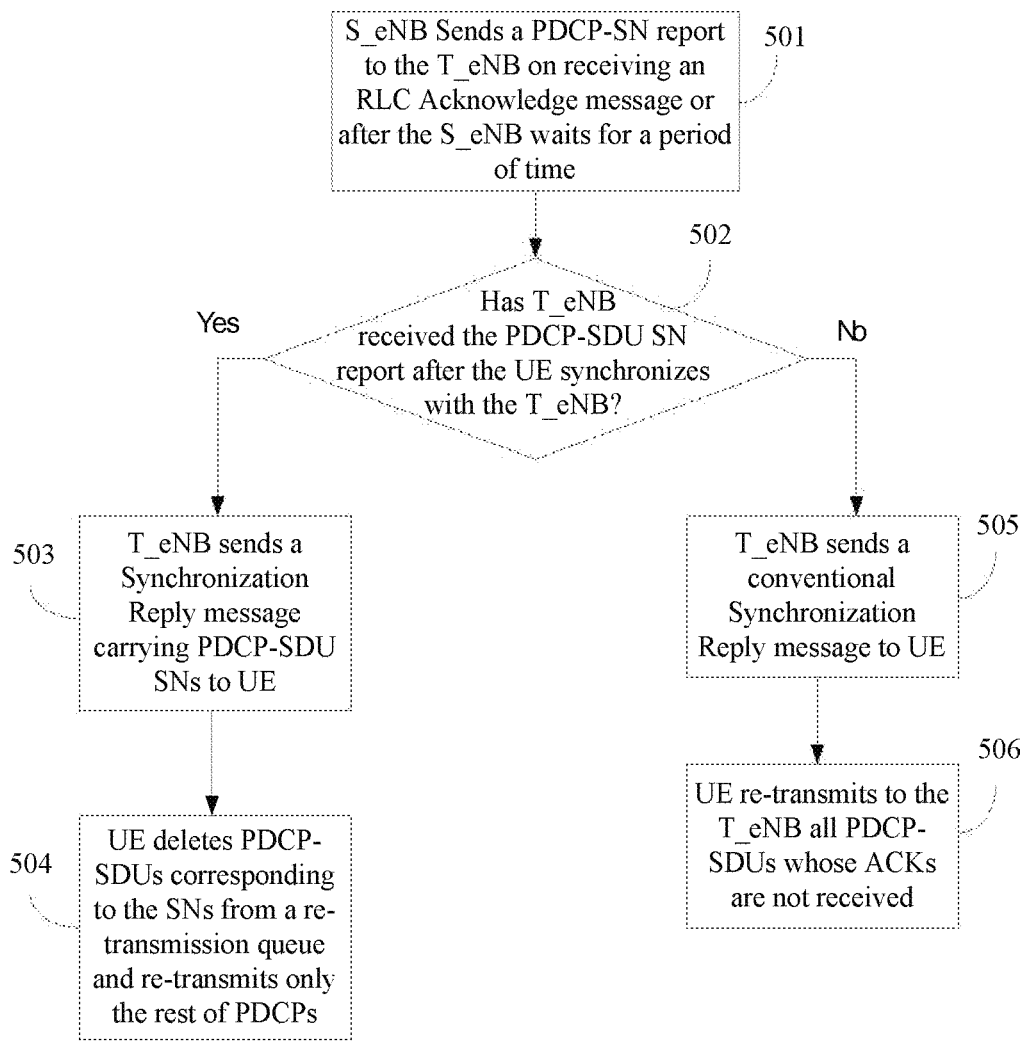
FIG. 5 is a flowchart of the first embodiment of the method according to the present invention.

FIG. 5 is a flowchart of the first embodiment, in which:

In step 501, after the S_eNB sends the Handover Command message to the UE, the S_eNB sends a PDCP-SN report to the T_eNB on receiving an RLC Acknowledge message or after the S_eNB waits for a period of time.

In step 502, it is determined whether the T_eNB has received the PDCP-SN report from the S_eNB after the UE synchronizes with the T_eNB. The branch of step 503 is executed if the T_eNB has received the PDCP-SN report from the S_eNB. The branch of step 505 is executed if the T_eNB has not received the PDCP-SN report from the S_eNB.

In step 503, the T_eNB sends a Synchronization Reply message carrying PDCP-SNs to the UE.

In step 504, the UE discards PDCP SDUs corresponding to the PDCP-SNs from a PDCP re-transmission queue in which corresponding ACKs are not received, and re-transmits only the rest of PDCP-SDUs in the re-transmission queue to the T_eNB.

In step 505, the T_eNB sends a Synchronization Reply message to the UE. Being the same as that in the conventional solution, the Synchronization Reply message includes UL resource allocation information and a time advance.

In step 506, the UE re-transmits to the T_eNB all PDCP-SDUs whose ACKs are not received.

With the present invention, insignificant re-transmission of PDCP-SDUs from the UE to the T_eNB can be avoided.

Figure 1:
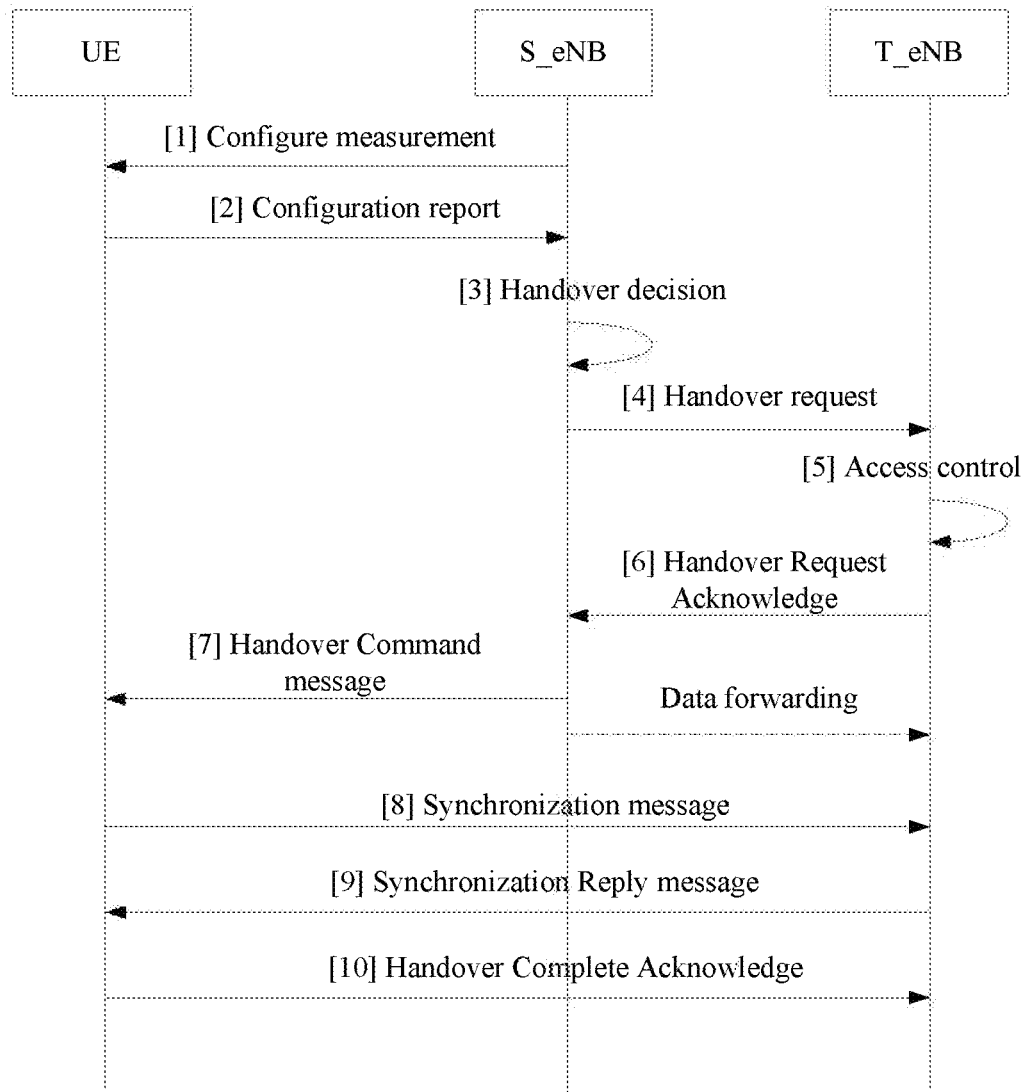
FIG. 1 is a diagram of cell handover in the LTE system in the prior art.
Figure 2:
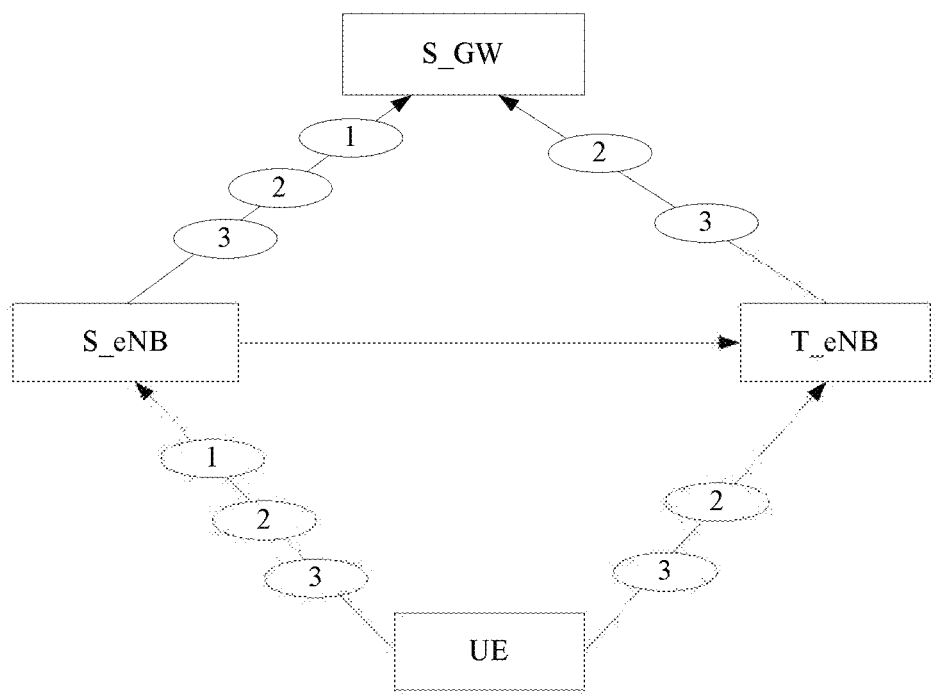
FIG. 2 is a first diagram of resending data from the UE in the prior art.
Figure 3:
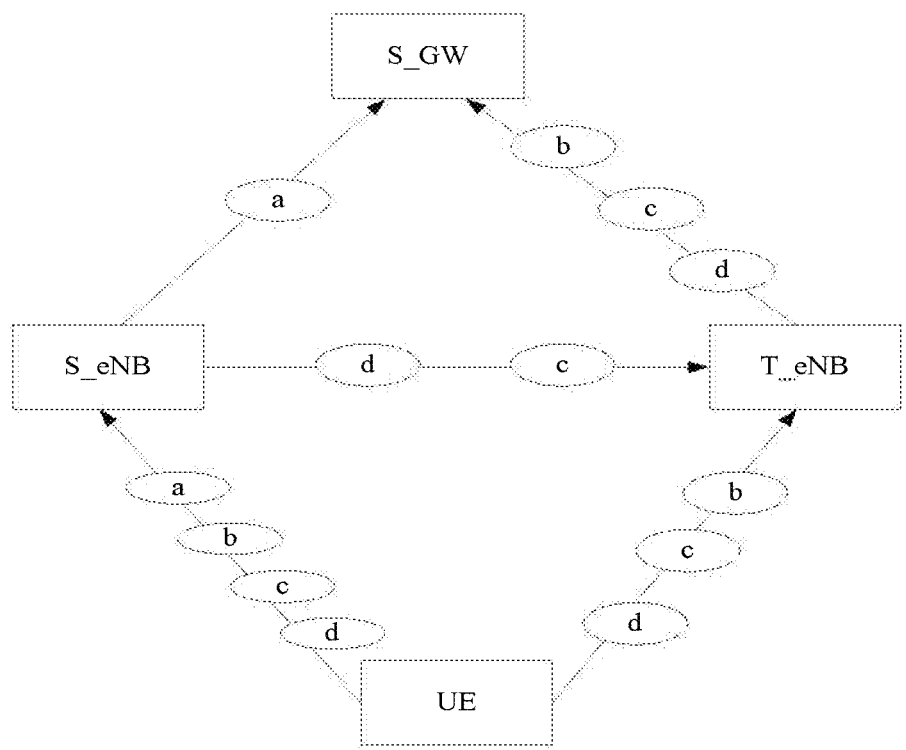
FIG. 3 is a second diagram of resending data from the UE in the prior art.
Figure 6:
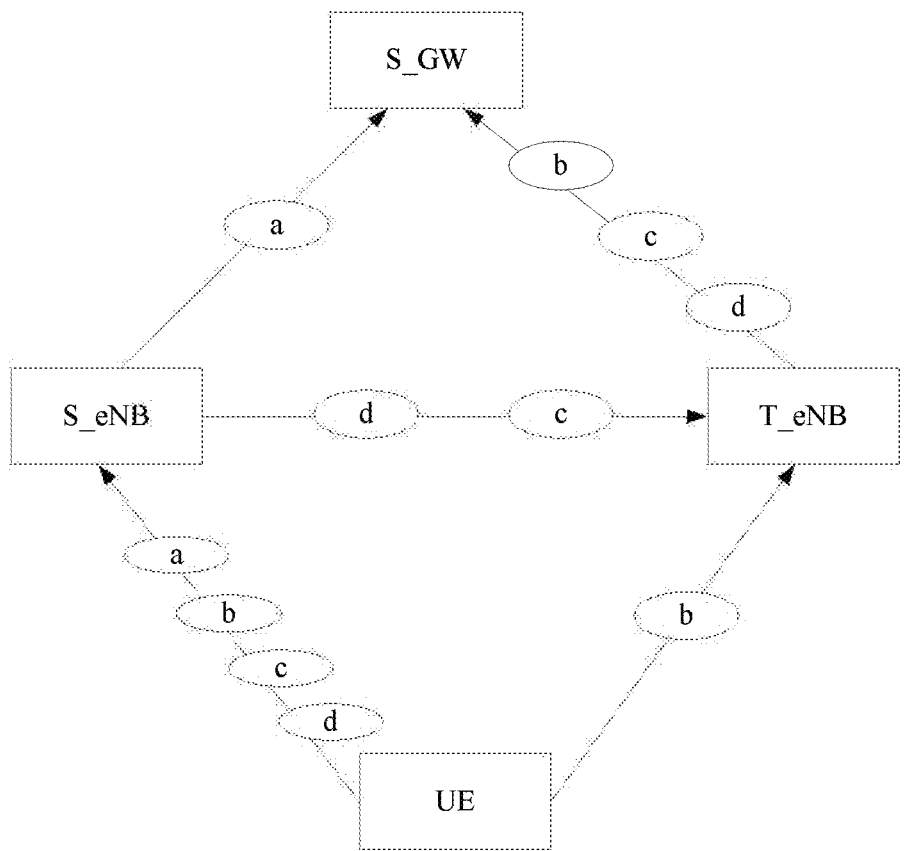
FIG. 6 is an exemplary diagram of the first embodiment of the method according to the present invention.

Also taking the scenario as illustrated in FIG. 3 as an example, the UE sends data a, b, c and d to the S_eNB, however, the data b fails during transmission, and the UE does not receive any ACK to the data b according. The S_eNB receives only the data a, c and d, and the data c and d becomes disordered. It is assumed that the UE does not receive any ACK to the data c and d. According to the solution of this embodiment, the S_eNB adds a step of assembling the PDCP-SDU SN report for the received PDCP-SDUs based on the conventional procedure. The PDCP-SDU SN report includes SNs of the data a, c and d. The S_eNB delivers the PDCP-SDU SN report to the T_eNB at an appropriate time (on receiving the RLC Acknowledge message, or after the S_eNB waits for a period of time). The T_eNB informs the UE that which PDCP-SDUs have been received by the S_eNB successfully through a Synchronization Reply message, i.e., the data a, c and d has been received, which need not to be re-transmitted. The UE receives only an ACK to the data a, and puts the data b, c and d to the re-transmission queue for re-transmission. However, the UE discards the data c and d from the re-transmission queue because the UE knows from the Synchronization Reply message that the data c and d has been received by the S_eNB. That is, the UE re-transmits only the failed data b to the T_eNB. Compared with the conventional solution, re-transmission of the data c and d (the S_eNB forwards the data c and d to the T_eNB by data forwarding) can be avoided, saving precious radio resource of the air interface. A diagram of processing the scenario of FIG. 3 by using this embodiment is illustrated in FIG. 6.

The second embodiment of the method according to the present invention is described hereinafter.

In the above first embodiment, the T_eNB sends a Reply message including no PDCP-SDU SN to the UE in a conventional manner after the synchronization of the UE in case of receiving no PDCP-SDU SN. In contrast, the T_eNB sends a Reply message to the UE after receiving PDCP-SDU SNs within a preset period of time in the second embodiment, delivering the PDCP-SDU SNs to the UE as far as possible and ensuring no re-transmission of redundant PDCP-SDUs from the UE.

Figure 7:
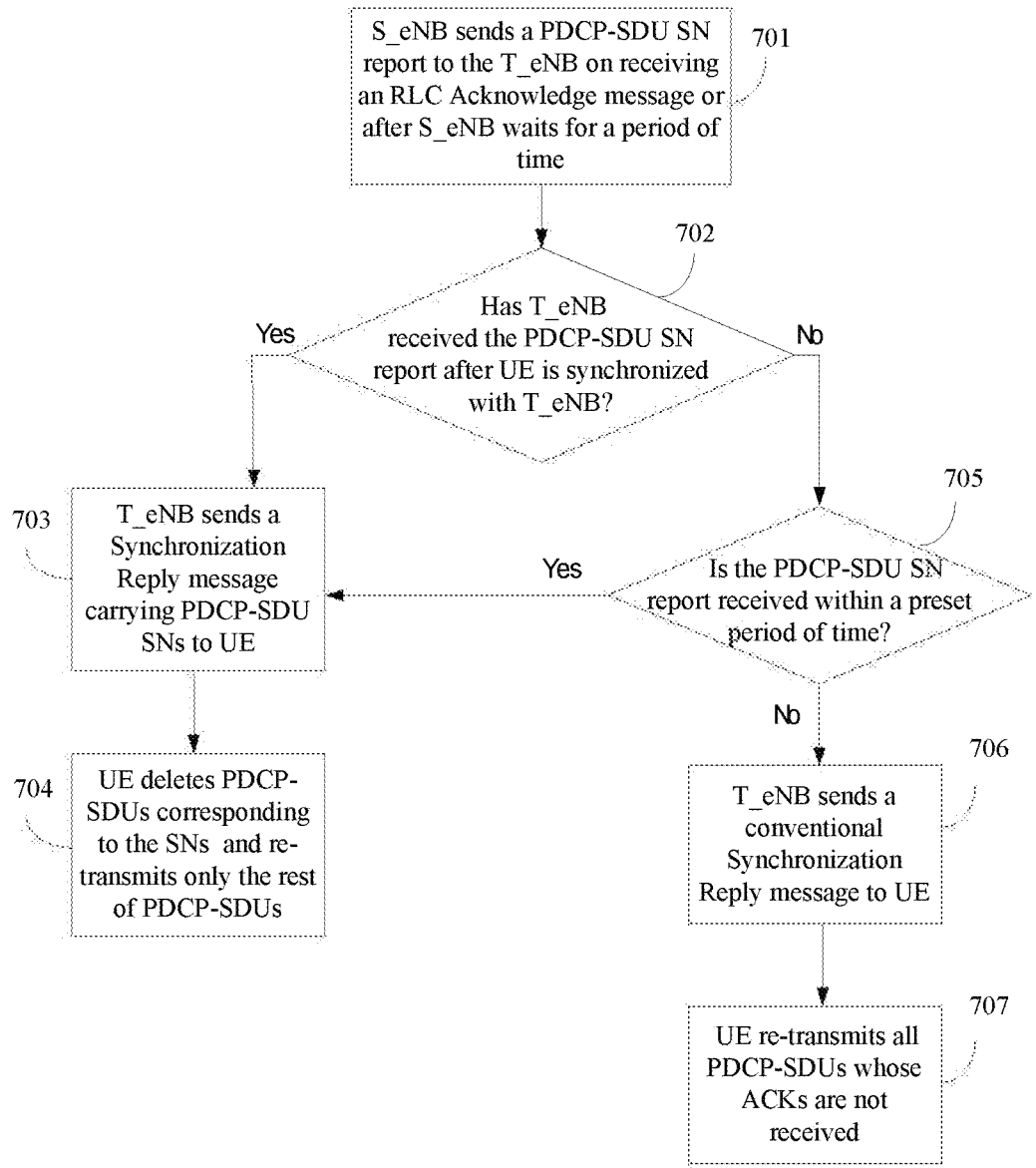
FIG. 7 is a flowchart of a second embodiment of the method according to the present invention.

FIG. 7 is a flowchart of the second embodiment, in which:

In step 701, after the S_eNB sends a Handover Command message to the UE, the S_eNB sends a PDCP-SDU SN report to the T_eNB on receiving an RLC Acknowledge message or after the S_eNB waits for a period of time.

In step 702, it is determined whether the T_eNB has received the PDCP-SDU SN report from the S_eNB after the UE is synchronized with the T_eNB. The branch of step 703 is executed if the T_eNB has received the PDCP-SDU SN report from the S_eNB. The branch of step 705 is executed if the T_eNB has not received the PDCP-SDU SN report from the S_eNB.

In step 703, the T_eNB sends a Synchronization Reply message carrying PDCP-SDU SNs to the UE.

In step 704, the UE discards PDCP-SDUs corresponding to the PDCP-SDU SNs from the PDCP re-transmission queue in which corresponding ACKs are not received, and re-transmits only the rest of PDCP-SDUs in the re-transmission queue to the T_eNB.

In step 705, it is determined whether the PDCP-SN report is received within a preset period of time. Step 703 is executed if the PDCP-SN report is received within a preset period of time. Step 706 is executed if the waiting time exceeds the period of time.

There is a plurality of reasons for failing to receive the PDCP-SN report, such as the delay of the X2 interface, or the network transmission congestion, or improper parsing of the received PDCP-SDU SNs at the T_eNB, in this case, step 706 is executed.

In step 706, the T_eNB sends a Synchronization Reply message to the UE. As being the same as that in the conventional solution, the Synchronization Reply message includes only UL resource allocation information and a time advance.

In step 707, the UE re-transmits all PDCP-SDUs whose ACKs are not received to the T_eNB.

Based on the first embodiment, the T_eNB does not send the Synchronization Reply message immediately in case of not receiving the PDCP-SDU SN report but waits for a period of time according to the second embodiment, further ensuring the reception of the Synchronization Reply message including PDCP-SDU SNs and further effectively ensuring saving of radio resource.

The third embodiment of the present invention is described hereinafter.

The third embodiment differs from the above two embodiments in that the processing of T_eNB after step 408. In the third embodiment, the T_eNB carries the PDCP-SDU SNs in the Reply message to the UE if the T_eNB has received the PDCP-SDU SN report from the S_eNB before the synchronization of UE. The T_eNB does not carry the PDCP-SDU SNs in the Reply message to the UE if the T_eNB has not received the PDCP-SDU SN report from the S_eNB after the synchronization of UE, but sends an RRC message, an RLC message or a MAC message to the UE carrying the PDCP-SDU SNs immediately once the T_eNB receives the PDCP-SDU SN report. Accordingly, the UE discards PDCP-SDUs corresponding to the PDCP-SDU SNs carried in the RRC message, the RLC message or the MAC message from the re-transmission queue, and re-transmits the rest of PDCP-SDUs of the queue to the T_eNB.

Figure 8:
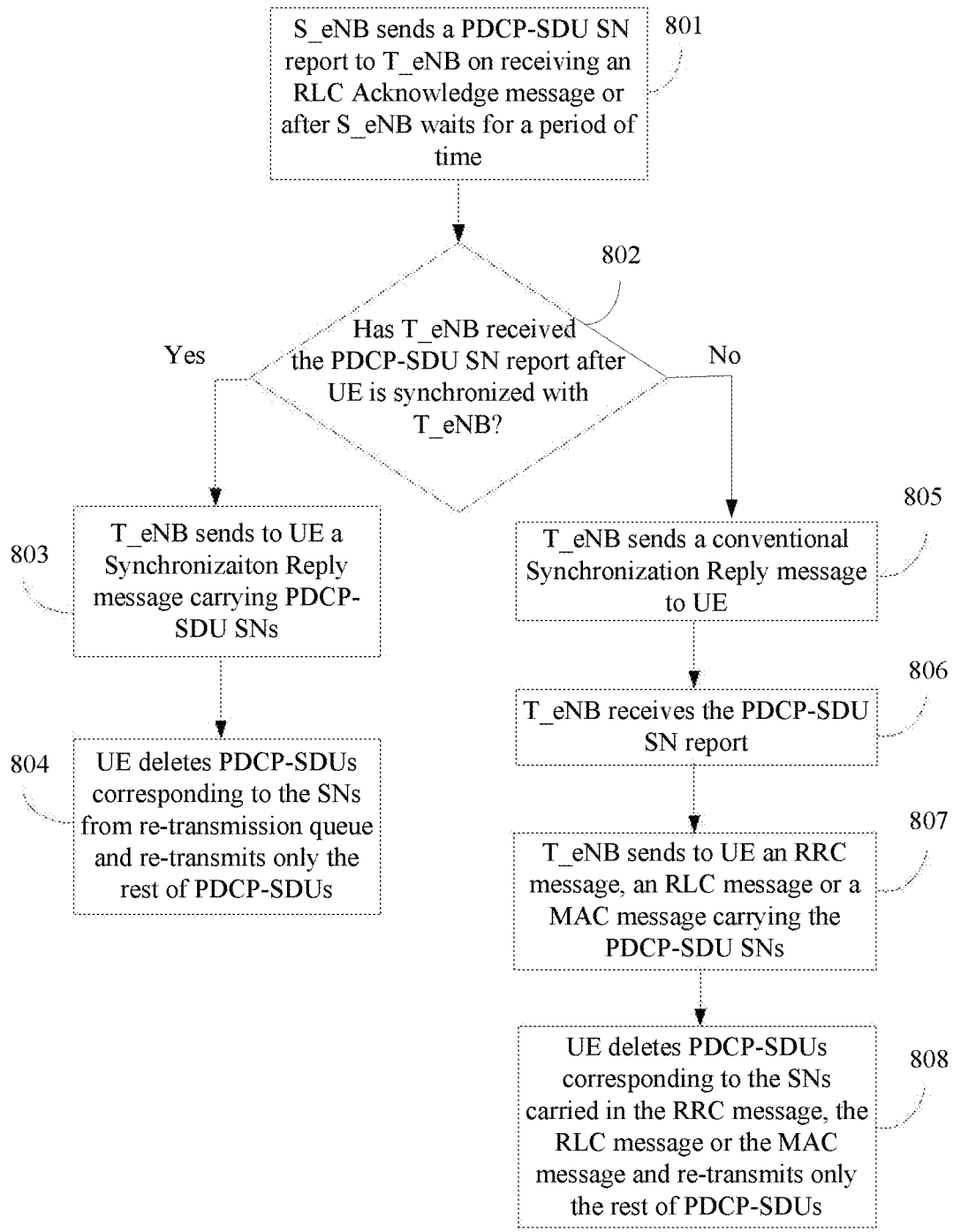
FIG. 8 is a flowchart of a third embodiment of the method according to the present invention.

FIG. 8 is flowchart of the third embodiment, in which:

In step 801, after the S_eNB sends a Handover Command message to the UE, the S_eNB sends a PDCP-SDU SN report to the T_eNB on receiving an RLC Acknowledge message or after the S_eNB waits for a period of time.

In step 802, it is determined whether the T_eNB has received the PDCP-SDU SN report sent from the S_eNB after the UE is synchronized with the T_eNB. The branch of step 803 is executed if the T_eNB has received the PDCP-SDU SN report sent from the S_eNB, otherwise the branch of step 805 is executed.

In step 803, the T_eNB sends to the UE a Synchronizaiton Reply message carrying PDCP-SDU SNs.

In step 804, the UE discards PDCP-SDUs corresponding to the PDCP-SDU SNs from the PDCP-SDU re-transmission queue in which corresponding ACKs are not received, and re-transmits only the rest of PDCP-SDUs in the re-transmission queue to the T_eNB.

In step 805, the T_eNB sends a Synchronization Reply message to the UE. As being the same as that in the conventional solution, the Synchronization Reply message includes only UL resource allocation information and a time advance.

In step 806, the T_eNB receives the PDCP-SDU SN report sent from the S_eNB.

In step 807, the T_eNB sends to the UE an RRC message, an RLC message or a MAC message carrying the PDCP-SDU SNs immediately.

In step 808, the UE discards PDCP-SDUs corresponding to the PDCP-SDU SNs carried in the RRC message, the RLC message or the MAC message from the re-transmission queue, and re-transmits only the rest of PDCP-SDUs in the queue to the T_eNB.

In this embodiment, the T_eNB still sends the Synchronization Reply message to the UE in the prior art in case of receiving no PDCP-SN report, which is well compatible with the prior art. The T_eNB sends to the UE the RRC message, the RLC message or the MAC message immediately so that the possibility of re-transmitting redundant PDCP-SDUs is reduced to the least extent, ensuring effective and reasonable utilization of radio resource.

Figure 9:
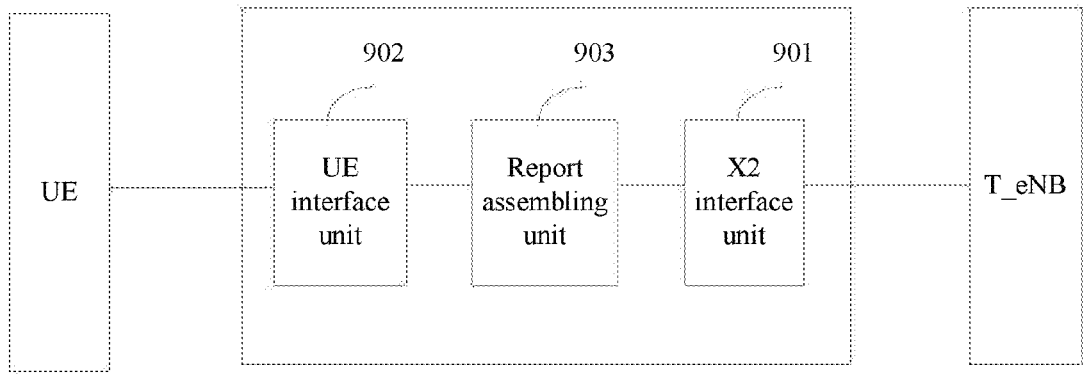
FIG. 9 is a diagram of a structure of an S_eNB device according to the present invention.

A diagram of a structure of an S_eNB according to the present invention is illustrated in FIG. 9. Besides an X2 interface unit 901 communicated with the T_eNB and a UE interface unit 902 communicated with the UE, the S_eNB includes a report assembling unit 903.

The report assembling unit 903 is mainly responsible for assembling a PDCP-SDU SN report including SNs of PDCP-SDUs received at the UE interface unit 902. The PDCP-SDU SN report is sent to the T_eNB at an appropriate time (on receiving an RLC Acknowledge message, or after the report assembling unit 903 waits for a period of time) via the X2 interface unit 901.

Figure 10:
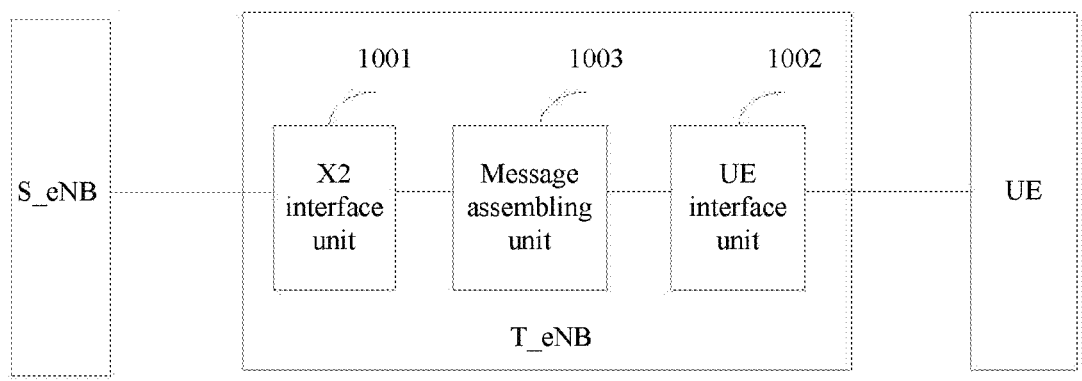
FIG. 10 is a diagram of a structure of a T_eNB device according to the present invention.

A diagram of a structure of a T_eNB according to the present invention is illustrated in FIG. 10. Besides an X2 interface unit 1001 communicated with the S_eNB and a UE interface unit 1002 communicated with the UE, the T_eNB includes a message assembling unit 1003.

The message assembling unit 1003 is mainly responsible for assembling a message including the PDCP-SDU SNs received at the S_eNB. Based on the functions of respective units of the conventional T_eNB, the X2 interface unit 1001 is further adapted to receive the PDCP-SDU SN report sent from the S_eNB, the report including the PDCP-SDU SNs received at the S_eNB. The UE interface unit 1002 is further adapted to send the message assembled by the message assembling unit 1003 to the UE. The message assembled by the message assembling unit 1003 may be a Synchronization Reply message, an RRC message, an RLC message, or a MAC message.

Figure 11:
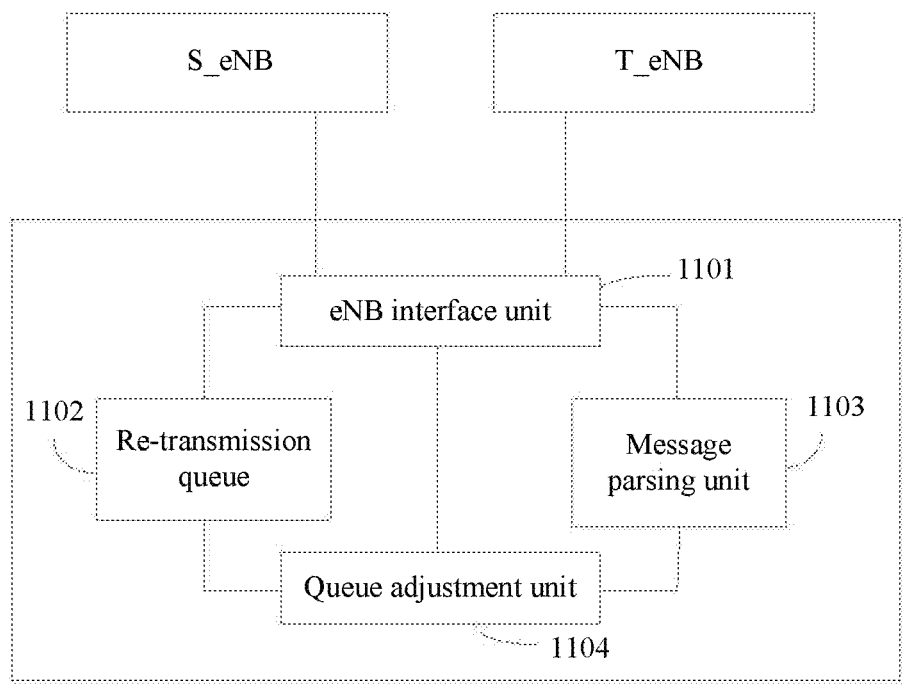
FIG. 11 is a diagram of a structure of a UE device according to the present invention.

A diagram of a structure of a UE according to the present invention is illustrated in FIG. 11. Besides an eNB interface unit 1101 communicated with the S_eNB or the T_eNB and a re-transmission queue 1102 in which PDCP-SDUs are buffered, the UE includes a message parsing unit 1103 and a queue adjustment unit 1104.

Based on conventional functions, the eNB interface unit 1101 is further adapted to receive from the T_eNB a message indicating PDCP-SDU SNs that have been received by the S_eNB. The message parsing unit 1103 is mainly responsible for parsing the message to obtain the PDCP-SDU SNs that have been received by the S_eNB. The queue adjustment unit 1104 is mainly responsible for discarding the PDCP-SDU SNs that have been received by the S_eNB from the re-transmission queue 1102. Accordingly, the eNB interface unit 1101 re-transmits the rest of PDCP-SDUs in the re-transmission queue 1102 to the T_eNB. The message indicating the PDCP-SDU SNs that have been received by the S_eNB may be a Synchronization Reply message, an RRC message, an RLC message, or a MAC message.

Reference can be made to the aforementioned method embodiments for specific implementations of the S_eNB, the T_eNB and the UE according to the present invention, which is not repeated here.

The above description is merely for preferred embodiments of the present invention. It should be noted that an ordinary skill in the art without departing from the scope of the present invention can make a plurality of changes and modifications, which shall be encompassed in the protection scope of the present invention.

The invention claimed is:

1. A method for indicating data re-transmission during cell handover in a Long Time Evolution (LTE) system, comprising:

sending, by a Source Evolved Node B (S_eNB), a Packet Data Convergence Protocol-Service Data Unit Sequence Number (PDCP-SDU SN) report to a Target Evolved Node B (T_eNB), for informing the T_eNB of all PDCP-SDUs that have been received by the S_eNB from User Equipment (UE); and informing, by the T_eNB, the UE of all the PDCP-SDUs that have been received by the S_eNB;

wherein the T_eNB informs the UE of all the PDCP-SDU SNs that indicate the PDCP-SDUs received by the S_eNB through a synchronization reply message, a Radio Resource Control (RRC) message, a Radio Link Control (RLC) message or a Media Access Control (MAC) message;

after the UE is synchronized with the T_eNB, the T_eNB determines whether the T_eNB has received the PDCP-SDU SN report, the T_eNB sends to the UE the synchronization reply message carrying the PDCP-SDUs SNs that indicate all the PDCP-SDCs have been received by the S_eNB if the T_eNB has received the PDCP-SDU SN report, and if the T_eNB has not received the PDCP-SDU SN report, the T_eNB waits for a preset period of time, and sends to the UE the synchronization reply message carrying no PDCP-SDU SN if the T_eNB does not receive the PDCP-SDU SN report within the preset period of time; and the T_eNB sends to the UE the synchronization reply message carrying the PDCP-SDU SNs that indicate all the PDCP-SDUs have been received by the S_eNB if the T_eNB receives the PDCP-SDU SN report within the preset period of time;

or after the UE is synchronized with the T_eNB, the T_eNB determines whether the T_eNB has received the PDCP-SDU SN report, the T_eNB sends to the UE the synchronization reply message carrying the PDCP-SDU SNs that indicate all the PDCP-SDUs have been received by the S_eNB if the T_eNB has received the PDCP-SDU SN report, and if the T_eNB has not received the PDCP-SDU SN report, the T_eNB sends to the UE the synchronization reply message carrying no PDCP-SDU SN; and the T_eNB sends to the UE the RRC message, the RLC message or the MAC message immediately to inform the UE of the PDCP-SDU SNs that indicate all the PDCP-SDUs have been received by the S_eNB.

2. The method according to claim 1, further comprising:

discarding, by the UE, all the PDCP-SDUs that have been received by the S_eNB from a re-transmission queue according to the received PDCP-SDU SNs, and re-transmitting only the rest of PDCP-SDUs in the queue to the T_eNB.

3. The method according to claim 1, wherein the time when the S_eNB sends the PDCP-SDU SN report to the T_eNB is when the S_eNB receives an acknowledge message to a handover command message fed back from the UE, or when a preset time arrives from the time of sending the handover command message from the UE if the S_eNB does not receive any acknowledge message to the handover command message.

* * * * *